Nov. 21, 1972  W. N. CARSON, JR., ET AL  3,703,358

METHOD OF GENERATING HYDROGEN WITH MAGNESIUM REACTANT

Original Filed Oct. 10, 1967

INVENTORS:
WILLIAM N. CARSON, JR.;
JAMES L. MANGANARO,
by Paul R. Webb, II
THEIR ATTORNEY

3,703,358
METHOD OF GENERATING HYDROGEN WITH MAGNESIUM REACTANT

William N. Carson, Jr., Schenectady, and James L. Manganaro, New York, N.Y., assignors to General Electric Company
Original application Oct. 10, 1967, Ser. No. 674,159. Divided and this application Aug. 21, 1969, Ser. No. 852,017
Int. Cl. H01m 29/04; C01b 1/03
U.S. Cl. 423—657
1 Claim

ABSTRACT OF THE DISCLOSURE

A method of generating hydrogen is described which has a magnesium reactant and an aqueous electrolyte with a dewatering agent. A method is also described for generating hydrogen. The dewatering agent reduces substantially the volume of magnesium hydroxide precipitation within the cell during its operation by freeing water from the precipitate thereby increasing its density.

---

This application is a division of our copending application, Ser. No. 674,159, filed Oct. 10, 1967, now abandoned, which is assigned to the same assignee as the present application.

This invention relates to cells and, more particularly, to cells including a magnesium reactant wherein a dewatering agent is incorporated into the aqueous electrolyte which cells are useful as gas generators.

Gas generators for the production of hydrogen include cells in which a magnesium reactant is contacted with an aqueous electrolyte. Such a cell employs also a structure similar to a metal-air cell which includes a cathode, an aqueous electrolyte, a magnesium anode, and a source of electrical energy to accelerate the evolution of hydrogen.

Metal-air cells are galvanic cells which use an oxidant of oxygen or oxygen from the air as the reactive material consumed by the positive electrode of the cell. The oxygen thereby serves as the cathode depolarizer. Magnesium is a commonly used anode material in such a cell since it is generally low in cost and light in weight. However, during the operation of such a cell, the magnesium forms a voluminous precipitate as a sludge in the electrolyte. Thus, the size of the cell is greatly in excess of the size needed for its power output in order to provide a sufficient volume of water and space for the precipitation product.

Our present invention is directed to improved cells in which a specific class of dewatering agents are incorporated in the electrolyte to reduce substantially the adverse effects of the precipitation from the magnesium anode during operation by freeing the water from the precipitate. The invention is described particularly in relation to a metal-air cell.

It is a primary object of our invention to provide an improved cell employing a magnesium anode wherein precipitation volume is reduced substantially.

It is another object of our invention to provide such an improved cell of a small size which will operate for a longer period of time and require less maintenance.

It is a further object of our invention to provide an electrolytic cell with a reduced precipitation volume.

In accordance with one aspect of our invention, an electrolytic cell comprises a cathode, a magnesium reactant, an aqueous electrolyte, electrical energy means in contact with the magnesium reactant and the cathode, and a dewatering agent from a specific class incorporated in the electrolyte.

These and various other objects, features, and advantages of the invention will be better understood from the following description taken in connection with the accompanying drawing in which.

Figure 1:
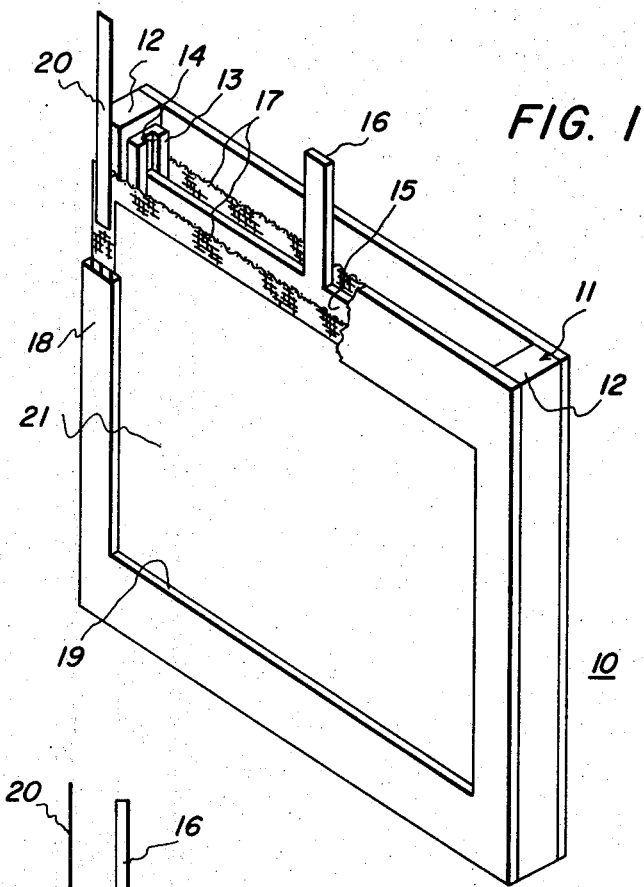
FIG. 1 is a perspective view of a metal-air cell embodying our invention.
Figure 2:
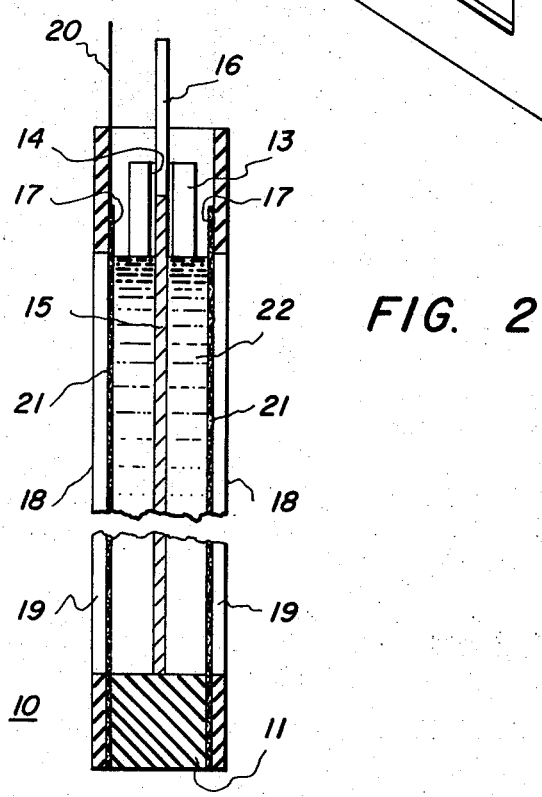
FIG. 2 is a vertical sectional view of the metal-air cell shown in FIG. 1.

In the FIGS. 1 and 2 of the drawing, there is shown generally at 10 an improved metal-air cell embodying our invention. Cell 10 has a casing 11 in the form of a U-shaped frame with a pair of opposite frame members 12. A pair of spaced guides 13 are positioned against the interior surfaces of respective members 12. Each guide 13 is provided with a vertical groove 14 to receive an edge of a magnesium anode plate 15. A terminal strip 16 is formed integrally with plate 15 and extends upwardly and outwardly from guides 13.

On opposite outer surfaces of casing 11 a metal screen 17 is shown sealed thereto. A face piece 18 is sealed to each of the opposite surfaces of casing 11 and overlies the edges of screen 17. Each of the face pieces 18 is provided with a large opening 19 whereby the portion of screen 17 lying within open portion 19 forms a part of a gas permeable, liquid impermeable cathode electrode which is coextensive with opening 19. A terminal strip 20 is attached to screen 17 near an edge to provide an electrical connection for the cathode. A cathode 21 is shown co-extensive with each opening 19 and includes the portion of screen 17 within such opening.

While the cathode is shown in the above form, various types of cathodes are known in the art for employment in a metal-air cell. The type of cathode shown in FIGS. 1 and 2 comprises screen 17 with a coating thereon of catalytic metal, unsupported or supported, and a binder of a suitable material, such as polytetrafluoroethylene, bonding the particles of the catalyst together and to screen 17 thereby resulting in cathode electrode 21. In such a cathode structure, the exterior faces thereof may be coated with a thin film of polytetrafluoroethylene to provide waterproofing for the structures.

In FIG. 2 of the drawing, an electrolyte 22 is shown within metal-air cell 10 between opposite cathodes 21 and anode 15. The aqueous electrolyte has incorporated therein a dewatering agent from a specific class of such agents. Suitable electrolytes include saline soltuions and dilute acid solutions.

We found that hydrogen gas can be generated by employing a cell with a magnesium reactant and an aqueous electrolyte. The hydrogen evolution is accelerated by incorporating a cathode, and a source of electrical energy to the cell. In such a cell the magnesium reactant becomes the anode. Such a reactant can be in various configurations, such as sheet, rod or pellets.

Such an electrolyte with a dewatering agent provides good performance in hydrogen gas evolution which extends over a longer time period than when an aqueous electrolyte is employed which does not contain such a dewatering agent. We found dewatering agents which reduced the precipitate volume by freeing water therefrom in such an aqueous electrolyte are selected from the class consisting of trisodium salt of ethylenediaminetetraacetic acid, tetrasodium salt of ethylenediaminetetraacetic acid, ethylenediaminetetraacetic acid, monosodium salt of N,N-di(2-hydroxyethyl) glycine, and mixtures of tetrasodium salt of ethylenediaminetetraacetic acid and monosodium salt of N,N-di(2-hydroxyethyl) glycine.

We have discovered that an improved electrochemical cell can be constructed by employing a cathode, a magnesium anode, and an aqueous electrolyte with a dewatering agent incorporated therein. We found that electrical energy can be generated by supplying an oxygen oxidant to the cathode of the above type of cell employing a saline or alkaline electrolyte thereby providing a metal-air cell.

We found that when such a cell with a magnesium anode had an aqueous electrolyte of the above types with a dewatering agent incorporated therein, a smaller cell could be employed for a similar high power output. The size reduction is accomplished by the smaller precipitation volume, and the reemployment of the water freed from the precipitate by the addition of the dewatering agent.

During the normal operation of a metal-air cell, magnesium hydroxide is formed from the magnesium anode and coats the cathode, and forms a voluminous precipitate or sludge at the bottom of the cell within the electrolyte. In our improved metal-air cell, the precipitate volume is reduced substantially by employing an aqueous electrolyte with a dewatering agent from the above-identified class. In this manner, a smaller cell can be employed which operates efficiently for a much longer time requiring a minimum of maintenance.

Examples of metal-air cells with electrolytes incorporating dewatering agents from the above class which were made in accordance with our invention are set forth below.

EXAMPLE 1

A metal-air cell was constructed and operated in accordance with FIGS. 1 and 2 of the drawing except that a single cathode was employed. The cathode was formed of a nickel screen on which had been provided a catalyst metal of platinum bonded together and to the screen by polytetrafluoroethylene in accordance with the teachings of the copending application of Leonard W. Niedrach and Harvey R. Alford, Ser. No. 232,689, filed Oct. 24, 1962, now U.S. Pat. 3,432,355 and assigned to the same assignee as the present application. The disclosure of the subject copending patent application is hereby incorporated by reference.

The anode was a magnesium alloy described in trade catalogues as No. AZ31–B, while the electrolyte consisted of 7 grams of sodium chloride and 93 grams of water. The electrolyte did not contain any dewatering agent. During operation, the volume of magnesium hydroxide precipitate was 5.9 cc./ampere-hour.

EXAMPLE 2

A metal-air cell was constructed and operated as set forth in Example 1 above. However, the electrolyte employed consisted of 5 grams of sodium chloride, 100 grams of water, and 2 grams of the sodium salt of N,N-di(2-hydroxyethyl) glycine, a dewatering agent in accordance with our invention. The volume of magnesium hydroxide precipitate was reduced substantially to 3.52 cc./ampere-hour.

EXAMPLE 3

A metal-air cell was constructed and operated as set forth above in Example 1. However, the electrolyte employed consisted of 4 grams of sodium chloride, 100 grams of water, and 4 grams of the sodium salt of N,N-di(2 - hydroxyethyl) glycine, the dewatering agent employed in Example 2. The volume of magnesium hydroxide precipitate was reduced substantially to 3.37 cc./ampere-hour.

While other modifications of the invention and variations thereof which may be employed within the scope of the invention have not been described, the invention is intended to include such as may be embraced within the following claim:

What we claim as new and desire to secure by Letters Patent of the United States is:

1. A method of generating hydrogen from a gas generator comprising providing said generator with a mixture including a magnesium reactant, an aqueous electrolyte, and a dewatering agent selected from the group consisting of monosodium salt of N,N-di(2-hydroxyethyl) glycine and a mixture of a sodium salt of ethylene diaminetetraacetic acid and monosodium salt of N,N-di(2-hydroxyethyl) glycine, said dewatering agent being incorporated in an amount sufficient to reduce substantially the volume of magnesium hydroxide precipitation within the gas generator during generating hydrogen.

References Cited

UNITED STATES PATENTS

| | | | |
|---|---|---|---|
| 3,256,504 | 6/1966 | Fidelman | 136—100 MX |
| 3,316,126 | 4/1967 | Le Duc | 136—86 |

ALLEN B. CURTIS, Primary Examiner

U.S. Cl. X.R.

136—86 A; 204—129